United States Patent
Watanabe et al.

(10) Patent No.: US 9,230,744 B2
(45) Date of Patent: Jan. 5, 2016

(54) MEMS DEVICE AND METHOD OF MANUFACTURING THE SAME

(71) Applicants: Kei Watanabe, Tokyo (JP); Yoshiaki Shimooka, Sagamihara (JP); Tomohiro Saito, Yokohama (JP); Tamio Ikehashi, Yokohama (JP)

(72) Inventors: Kei Watanabe, Tokyo (JP); Yoshiaki Shimooka, Sagamihara (JP); Tomohiro Saito, Yokohama (JP); Tamio Ikehashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 387 days.

(21) Appl. No.: 13/621,982

(22) Filed: Sep. 18, 2012

(65) Prior Publication Data

US 2013/0182366 A1 Jul. 18, 2013

(30) Foreign Application Priority Data

Jan. 13, 2012 (JP) .................................. 2012-005487

(51) Int. Cl.
*H01G 5/00* (2006.01)
*H01G 5/16* (2006.01)
*H01G 5/011* (2006.01)

(52) U.S. Cl.
CPC ................. *H01G 5/16* (2013.01); *H01G 5/011* (2013.01); *Y10T 29/42* (2015.01)

(58) Field of Classification Search
USPC .......................................... 361/277–278, 281
See application file for complete search history.

(56) References Cited

U.S. PATENT DOCUMENTS

| 7,299,538 | B2 | 11/2007 | Tactic-Lucic | |
| 8,138,655 | B2* | 3/2012 | Ikehashi et al. | 310/309 |
| 2001/0002872 | A1* | 6/2001 | Dhuler | 361/277 |
| 2004/0004592 | A1 | 1/2004 | Ikeda et al. | |
| 2006/0187611 | A1* | 8/2006 | Won et al. | 361/277 |
| 2006/0215348 | A1* | 9/2006 | Won et al. | 361/277 |
| 2009/0190284 | A1* | 7/2009 | Konishi et al. | 361/277 |
| 2011/0063773 | A1* | 3/2011 | Ikehashi | 361/277 |
| 2011/0063774 | A1 | 3/2011 | Ikehashi et al. | |

FOREIGN PATENT DOCUMENTS

| JP | 2003-21798 | 1/2003 |
| JP | 2011-66150 | 3/2011 |
| JP | 2011-66156 | 3/2011 |

OTHER PUBLICATIONS

First Office Action issued by the Japanese Patent Office on Nov. 18, 2014, in counterpart Japanese Patent Application No. 2012-005487.

* cited by examiner

*Primary Examiner* — Eric Thomas
(74) *Attorney, Agent, or Firm* — Finnegan, Henderson, Farabow, Garrett & Dunner, LLP

(57) ABSTRACT

According to one embodiment, a MEMS element comprises a first electrode fixed on a substrate, a second electrode formed above the first electrode to face it, and vertically movable, a first anchor portion formed on the substrate and configured to support the second electrode, and a first spring portion configured to connect the second electrode and the first anchor portion. The first spring portion includes a liner layer includes a brittle material in contact with the second electrode and the first anchor portion, and a base layer formed on the liner layer, includes a brittle material having a composition different from that of the liner layer, and having a film thickness larger than that of the liner layer.

13 Claims, 8 Drawing Sheets

MEMS DEVICE AND METHOD OF MANUFACTURING THE SAME

CROSS-REFERENCE TO RELATED APPLICATIONS

This application is based upon and claims the benefit of priority from Japanese Patent Application No. 2012-005487, filed Jan. 13, 2012, the entire contents of which are incorporated herein by reference.

FIELD

Embodiments described herein relate generally to a MEMS device and a method of manufacturing the same.

BACKGROUND

A device (to be referred to as a micro-electromechanical system [MEMS] variable capacitance device hereinafter) in which a MEMS is applied as a variable capacitance element can achieve low loss, high isolation, and high linearity, and hence is expected as a key device for implementing a multi-band, multi-mode configuration of a next generation portable terminal.

The MEMS variable capacitance device can achieve low loss because a low-resistivity metal material is used as the capacitance electrode of a variable capacitance element as a movable portion. More specifically, aluminum (Al) or gold (Au) is used as the capacitance electrode. A metal material like this is generally ductile.

When the movable capacitance electrode is repetitively driven, therefore, the shape of the movable portion is distorted because of creep (a shape change caused by stress) of a member forming the movable portion.

In the MEMS variable capacitance device, if the electrode as a movable portion deforms because of the creep, the spacing between two electrodes forming the capacitance electrode changes from a predetermined spacing. Accordingly, the capacitance of the variable capacitance element changes from a designed value when the MEMS variable capacitance device is used for long time periods.

As a means for avoiding this creep, a material having small plastic deformation, for example, a hard metal material having brittleness such as an aluminum titanium (AlTi) alloy or tungsten (W) is used as the movable portion. However, a metal material like this has high resistivity and increases the loss, when compared to Al and Au.

As another means, a structure obtained by stacking a metal layer of a ductile material and an insulating layer of a brittle material is used as the movable portion. In this multilayered structure, however, the variable portion readily warps because of the difference between the internal stresses of the ductile material and brittle material. Consequently, the shape of the movable portion deforms.

To solve the problem of the deterioration of the movable portion caused by the creep and the problem of the deformation of the movable portion caused by the internal stress as described above, a method of connecting the movable portion and an anchor portion by using a spring portion made of the ductile material and having a small spring constant and a spring portion made of the brittle material and having a large spring constant has been proposed.

Unfortunately, it is difficult to form a structure having desired characteristics when the spring portion is formed using the brittle material.

DETAILED DESCRIPTION

Figure 1:
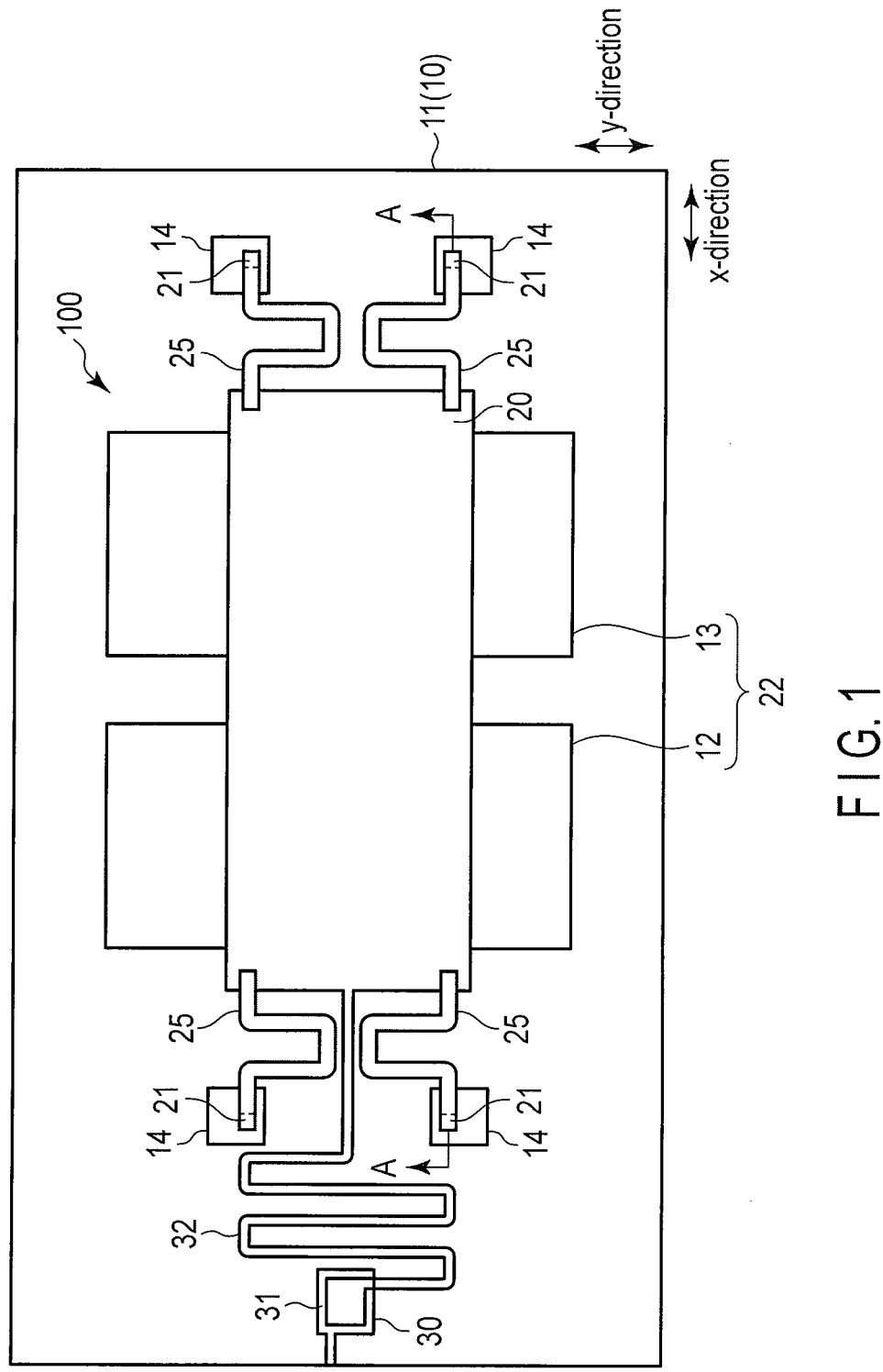
FIG. 1 is a plan view showing the structure of a MEMS device according to an embodiment.

In general, according to one embodiment, a MEMS element comprises a first electrode fixed on a substrate, a second electrode formed above the first electrode to face it and vertically movable, a first anchor portion formed on the substrate and supporting the second electrode, and a first spring portion connecting the second electrode and the first anchor portion. The first spring portion includes a liner layer comprising a brittle material in contact with the second electrode and first anchor portion, and a base layer formed on the liner layer, comprising a brittle material having a composition different from that of the liner layer, and having a film thickness larger than that of the liner layer.

In a MEMS device, a spring portion made of a brittle material (for example, silicon nitride) is formed to cover a step between a lower sacrificial layer that finally functions as a midair portion and a movable portion (electrode), and a step between the lower sacrificial layer and an anchor portion. The film quality of the spring portion (brittle material) formed on these steps deteriorates. In particular, the film quality of the bent portion of the spring portion positioned on the step deteriorates. Accordingly, the etching rate of the brittle material formed on the steps becomes higher than that of the brittle material formed on flat portions (the upper surfaces of the lower sacrificial layer, electrode, and anchor portion). Consequently, the brittle material on the step is disconnected when processing the spring portion. Even if the brittle material is not disconnected, it thins and weakens the durability when the device is repetitively driven.

By contrast, this embodiment solves the above mentioned problem by giving a multilayered structure to the spring portion made of the brittle material.

This embodiment will be explained below with reference to the accompanying drawing. In the drawing, the same reference numerals denote the same parts. Also, a repetitive explanation will be made as needed.

EMBODIMENT

A MEMS device 100 according to this embodiment will be explained below with reference to FIGS. 1, 2, 3, 4, 5, 6, 7, and 8. This embodiment is an example in which a first spring portion 25 for connecting an upper capacitance electrode 20 and first anchor portion 21 has a multilayered structure including a liner layer 23 and base layer 24 made of a brittle material. This makes it possible to form the first spring portion 25 having a shape that achieves desired characteristics in the MEMS device 100.

[Structure]

First, the structure of the MEMS device 100 according to this embodiment will be explained with reference to FIGS. 1 and 2. The MEMS device 100 according to this embodiment will be explained by taking a MEMS variable capacitance element as an example.

Figure 2:
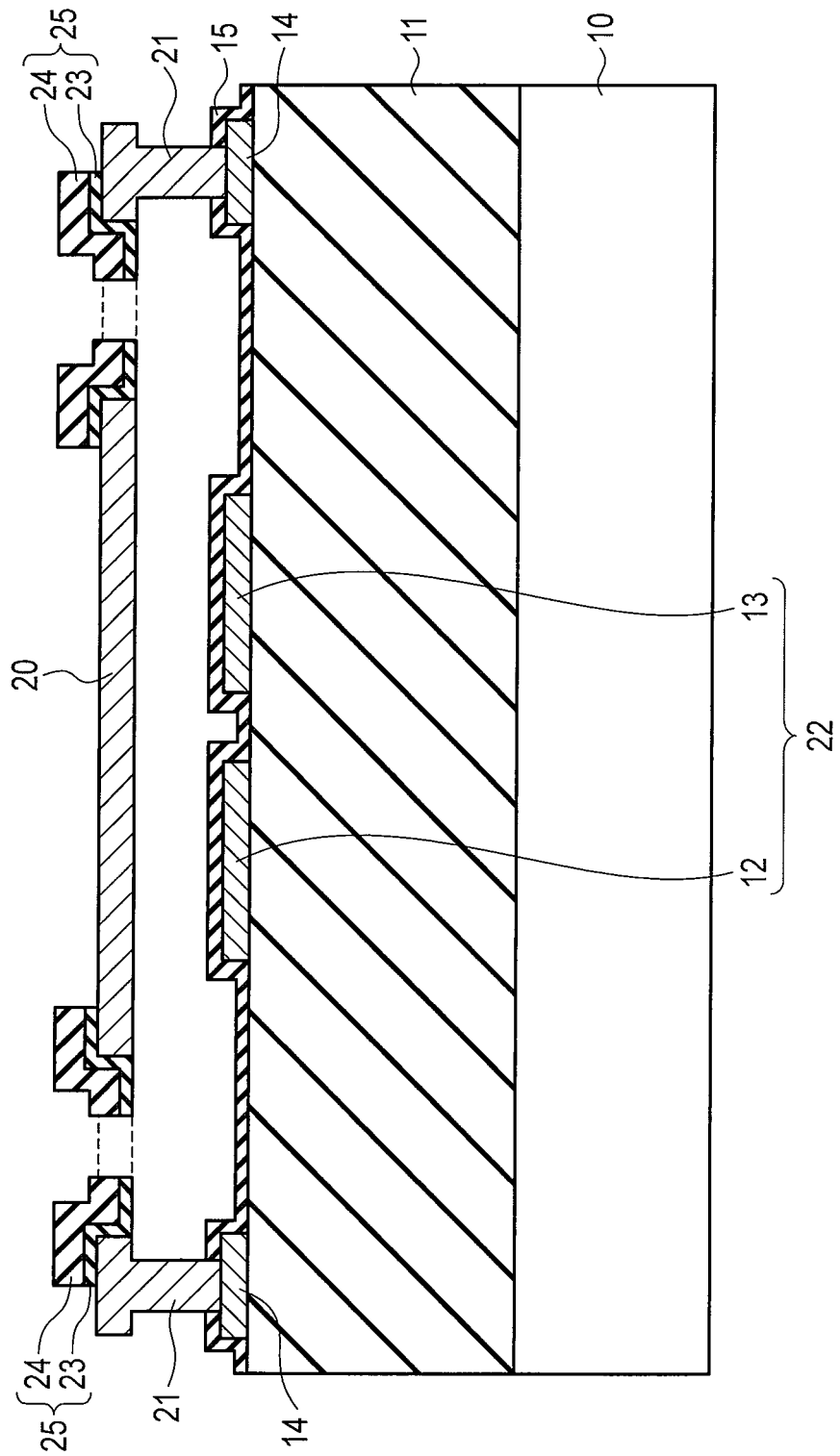
FIG. 2 is a sectional view showing the structure of the MEMS device according to the embodiment.

FIG. 1 is a plan view showing the structure of the MEMS device 100 according to this embodiment. FIG. 2 is a sectional view showing the structure of the MEMS device 100 according to this embodiment, and is a sectional view taken along line A-A in FIG. 1.

As shown in FIGS. 1 and 2, the MEMS device 100 according to this embodiment includes lower capacitance electrodes (lower electrodes) 22 formed on an interlayer dielectric layer 11 on a substrate 10, and the upper capacitance electrode (upper electrode) 20.

The substrate 10 is, for example, a silicon substrate. The interlayer dielectric layer 11 is desirably made of a low k material in order to decrease the parasitic capacitance. The interlayer dielectric layer 11 is made of, for example, silicon oxide ($SiO_2$) using $SiH_4$ or tetraethyl-orthosilicate (TEOS) as a material. Also, the film thickness of the interlayer dielectric layer 11 is preferably large in order to decrease the parasitic capacitance. For example, the film thickness of the interlayer dielectric layer 11 is preferably 10 μm or more.

Elements such as field effect transistors can be formed on the surface of the substrate 10. These elements form a logic circuit and memory circuit. The interlayer dielectric layer 11 is formed on the substrate 10 so as to cover these circuits. Therefore, the MEMS device 100 is formed above the circuits on the substrate 10.

Note that a circuit such as an oscillator that generates noise is desirably not formed below the MEMS device 100. Note also that a shield metal can be formed in the interlayer dielectric layer 11 to prevent noise from a circuit in a lower layer from propagating to the MEMS device 100. Furthermore, an insulating substrate such as a glass substrate can be used instead of the substrate 10 and interlayer dielectric layer 11.

The lower capacitance electrodes 22 and upper capacitance electrode 20 form one variable capacitance element.

The lower capacitance electrodes 22 include a signal electrode (first lower electrode) 12 and ground electrode (second lower electrode) 13 fixed on the substrate 10 (interlayer dielectric layer 11). The signal electrode 12 and ground electrode 13 make a pair, and the potential difference between the signal electrode 12 and ground electrode 13 produced via the upper capacitance electrode 20 is handled as the output (RF power/RF voltage) of the MEMS device (MEMS variable capacitance device) 100. The potential of the signal electrode 12 is variable, and the potential of the ground electrode 13 is set at a predetermined potential (for example, ground potential). The signal electrode 12 and ground electrode 13 have, for example, a square planar shape, and extend in the y-direction. Note that the present invention is not limited to this, and the signal electrode 12 and ground electrode 13 can also have a circular or elliptical planar shape.

The signal electrode 12 and ground electrode 13 are made of a metal such as Al, copper (Cu), or Au, or an alloy containing at least one of these metals. The film thickness of the signal electrode 12 and ground electrode 13 is, for example, about 1 μm.

Note that the lower capacitance electrodes 22 may also be a single electrode, instead of the two electrodes (the signal electrode 12 and ground electrode 13).

The upper capacitance electrode 20 is formed above the signal electrode 12 and ground electrode 13 so as to face them. In other words, the upper capacitance electrode 20 is supported in the air (in a midair state). The upper capacitance electrode 20 has, for example, a square planar shape, and extends in the x-direction. Note that the present invention is not limited to this, and the upper capacitance electrode 20 may also have a circular or elliptical planar shape. The upper and lower capacitance electrodes 20 and 22 partially overlap each other in a plane (a plane spreading in the x- and y-directions).

The upper capacitance electrode 20 is made of Al, an alloy containing Al as a main component, Cu, Au, or platinum (Pt). That is, the upper electrode 15 is made of a ductile material. When a member made of the ductile material is destroyed by applying stress to the member, the member is destroyed after causing a large plastic deformation (extension).

The upper capacitance electrode 20 is movable in a direction perpendicular to the surface of the substrate 10 (in the vertical direction). That is, the distance between the upper and lower capacitance electrodes 20 and 22 changes, and the capacitance between them changes accordingly.

A lower electrode protective layer 15 made of an insulator such as silicon oxide, silicon nitride (SiN), or a high-k material is formed on the signal electrode 12 and ground electrode 13. In other words, the lower electrode protective layer 15 covers and protects the surfaces of the signal electrode 12 and ground electrode 13.

As described previously, the upper capacitance electrode 20 forms the variable capacitance element together with the lower capacitance electrodes 22. In this example, the upper capacitance electrode 20 also functions as a driving electrode making a pair with the two lower electrodes 22 (the signal electrode 12 and ground electrode 13). That is, in the MEMS variable capacitance device 100 of this example, the upper electrode 20 and two lower electrodes 22 form an actuator.

In the MEMS variable capacitance device 100 of this example, electrostatic attraction occurs when a potential difference is given between the upper and lower capacitance electrodes 20 and 22. This electrostatic attraction occurring between the upper and lower capacitance electrodes 20 and 22 moves the upper capacitance electrode 20 in the direction perpendicular to the surface of the substrate 10 (the lower capacitance electrodes 22) (in the vertical direction), thereby fluctuating the spacing between the upper and lower capacitance electrodes 20 and 22. This fluctuation in inter electrode distance changes the capacitance (electrostatic capacitance) of the MEMS variable capacitance device 100. Accordingly, the potential of the capacitance electrode (in this case, the signal electrode 12) changes, and the capacitance electrodes (the signal electrode 12 and ground electrode 13) output a radio-frequency (RF) signal.

A second spring portion 32 and a plurality of second spring portions 25 are connected to the movable upper capacitance electrode 20 supported in midair. The first and second spring portions 32 and 25 are made of different materials.

One end of the second spring portion 32 is connected to one end (end portion) of the upper capacitance electrode 20 in the x-direction. The second spring portion 32 is formed integrally with, for example, the upper capacitance electrode 20. That is, the upper capacitance electrode 20 and second spring portion 32 form a continuous single layered structure, and are formed on the same level. The second spring portion 32 has, for example, a meandering planar shape. In other words, the second spring portion 32 has an elongated meandering shape in a plane.

The second spring portion 32 is made of, for example, a conductive ductile material, and made of the same material as that of the upper capacitance electrode 20. For example, the second spring portion 32 is made of a metal material such as Al, an alloy containing Al as a main component, Cu, Au, or Pt.

A second anchor portion 31 is connected to the other end of the second spring portion 32. The second anchor portion 31 supports the upper capacitance electrode 20. The second anchor portion 31 is formed integrally with, for example, the second spring portion 32. Therefore, the second anchor portion 31 is made of, for example, a conductive ductile material, and made of the same material as that of the upper capacitance electrode 20 and second spring portion 32. For example, the second anchor portion 31 is made of a metal material such as Al, an alloy containing Al as a main component, Cu, Au, or Pt. Note that the second anchor portion 31 may also be made of a material different from that of the upper capacitance electrode 20 and second spring portion 32.

The second anchor portion 31 is formed on an interconnection 30. The interconnection 30 is formed on the interlayer dielectric film 11 on the substrate 10. The surface of the interconnection 30 is covered with an insulating layer (not shown). This insulating layer is formed integrally with, for example, the lower capacitance electrode protective layer 15. An opening is formed in this insulating layer, and the second anchor portion 31 is in direct contact with the interconnection 30 through this opening. That is, the upper capacitance electrode 20 is electrically connected to the interconnection 30 via the second spring portion 32 and second anchor portion 31, and connected to various circuits. Consequently, a potential (voltage) is supplied to the upper capacitance electrode 20 via the interconnection 30, second anchor portion 31, and second spring portion 32.

The first spring portion 25 is formed at each of the four corners (the end portions in the x- and y-directions) of the upper capacitance electrode 20 having a square shape. Note that the four second spring portions 25 are formed in this example, but the present invention is not limited to this number.

One end of the first spring portion 25 is formed on the upper capacitance electrode 20. Therefore, the connecting portion of the first spring portion 25 and upper capacitance electrode 20 has a multilayered structure. The other end of the first spring portion 25 is formed on the first anchor portion 21. Accordingly, the connecting portion of the first spring portion 25 and first anchor portion 21 has a multilayered structure. The second anchor portions 21 support the upper capacitance electrode 20. The first spring portion 25 is in midair between the upper capacitance electrode 20 and first anchor portion 21, and formed on the same level as that of the upper capacitance electrode 20. Also, the first spring portion 25 has, for example, a meandering planar shape between the upper capacitance electrode 20 and first anchor portion 21.

The first anchor portion 21 is formed on a dummy layer 14. The dummy layer 14 is formed on the interlayer dielectric layer 11 on the substrate 10. The surface of the dummy layer 14 is covered with an insulating layer formed integrally with, for example, the lower capacitance electrode protective layer 15. An opening is formed in this insulating layer, and the first anchor portion 21 is in direct contact with the dummy layer 14 through this opening. Note that the first anchor portion 21 need not be in direct contact with the dummy layer 14.

The first spring portion 25 is made of, for example, a brittle material. When a member made of the brittle material is destroyed by applying stress to the member, the member is destroyed after causing almost no plastic deformation (shape change). Generally, the energy (stress) required to destroy a member using the brittle material is lower than that required to destroy a member using the ductile material. That is, a member using the brittle material is destroyed more easily than a member using the ductile material.

The arrangement and material of the first spring portion 25 according to this embodiment will be described in more detail later.

Note that the first anchor portion 21 can be made of the same material (for example, the brittle material) as that of the first spring portion 25, or the same material (for example, the ductile material) as that of the second anchor portion 31. The interconnection 30 and dummy layer 14 are made of, for example, the same material as that of the lower capacitance electrode 22. The film thickness of the interconnection 30 and dummy layer 14 is almost equal to that of the lower capacitance electrode 22. Also, the insulating layer covering the interconnection 30 and dummy layer 14 is made of the same material as that of the lower electrode protective layer 15 covering the lower capacitance electrode 22, and has a film thickness almost equal to that of the lower electrode protective layer 15.

A spring constant k2 of the first spring portion 25 using the brittle material is made larger than a spring constant k1 of the second spring portion 32 using the ductile material, by appropriately setting at least one of, for example, the line width, film thickness, and flexure of the first spring portion 25.

When the second spring portion 32 made of the ductile material and the first spring portion 25 made of the brittle material are connected to the movable upper capacitance electrode 20 as in this example, the spacing between the capacitance electrodes in a state (to be referred to as an up state hereinafter) in which the upper capacitance electrode 20 is pulled up is practically determined by spring constant k2 of the first spring portion 25 using the brittle material.

The first spring portion 25 made of the brittle material hardly causes creep. Even when the MEMS variable capacitance device 100 is repetitively driven a plurality of number of times, therefore, the fluctuation in spacing between the capacitance electrodes in the up state is small. Note that the creep of a material is a phenomenon in which the distortion (shape change) of a given member increases with time or when stress is applied to the member.

The second spring portion 32 made of the ductile material causes creep when driven a plurality of number of times. However, spring constant k1 of the second spring portion 32 is set smaller than spring constant k2 of the first spring portion 25 using the brittle material. Accordingly, the shape change (flexure) of the second spring portion 32 using the ductile material exerts no large influence on the spacing between the capacitance electrodes in the up state.

In this example, therefore, a conductive ductile material can be used as the movable upper capacitance electrode (movable structure) 20. That is, a low resistivity material can be used as the movable upper capacitance electrode 20 without taking the creep into consideration. This makes it possible to reduce the loss of the MEMS device (in this embodiment, the MEMS variable capacitance device) 100.

Furthermore, in this embodiment, the second spring portion 32 made of the ductile material and the plurality of second spring portions 25 made of the brittle material are connected to the movable upper capacitance electrode 20. Accordingly, the influence of the creep on the upper capacitance electrode 20 made of the ductile material as a movable portion can be suppressed without staking a member made of a different material (for example, the brittle material) on the movable upper capacitance electrode 20. Therefore, no member made of the brittle material need be stacked on the upper capacitance electrode 20, and the shape of the upper capacitance electrode 20 is not distorted by the difference between the internal stress of the upper capacitance electrode 20 and that of a material stacked on it.

The arrangement and material of the first spring portion 25 according to this embodiment will be explained in more detail below.

As shown in FIG. 2, the first spring portion 25 according to this embodiment includes the liner layer 23 as a lower portion and the base layer 24 as an upper portion, and connects the upper capacitance electrode 20 and first anchor portion 21.

The liner layer 23 is connected to the upper capacitance electrode 20 and first anchor portion 21. More specifically, the liner layer 23 has one end formed in continuous contact with the upper surface and side surface of the upper capacitance electrode 20, and the other end formed in continuous contact with the upper surface and side surface of the first anchor portion 21. In other words, the liner layer 23 is formed to cover the steps of the upper capacitance electrode 20 and first anchor portion 21. Also, the liner layer 23 is in the air between the upper capacitance electrode 20 and first anchor portion 21. That is, the liner layer 23 is continuously formed from the upper surface and side surface of the upper capacitance electrode 20 to the side surface and upper surface of the first anchor portion 21.

The base layer 24 is continuously formed on the liner layer 23. That is, the base layer 24 is formed to cover the steps of the upper capacitance electrode 20 and first anchor portion 21 via the liner layer 23, and in the air between the upper capacitance electrode 20 and first anchor portion 21 via the liner layer 23.

The liner layer 23 and base layer 24 are made of brittle materials different in composition. "Different in composition" includes not only the difference between constituent elements, but also the difference between the ratios (composition ratios) of the constituent elements. More specifically, the liner layer 23 is made of, for example, silicon oxide, and the base layer 24 is made of, for example, silicon nitride.

Also, the base layer 24 is formed to have a film thickness larger than that of the liner layer 23. More specifically, the film thickness of the base layer 24 is, for example, about 500 nm to 5 μm, and the film thickness of the liner layer 23 is, for example, about 25 nm to 1 μm.

Note that the combination of the brittle materials of the liner layer 23 and base layer 24 is not limited to silicon oxide/silicon nitride, and is appropriately determined by taking account of the following conditions.

The liner layer 23 is desirably made of a material that is formed to have film quality higher than that of the base layer 24, on (in particular, on the steps of) the upper capacitance electrode 20 and first anchor portion 21 (the conductive ductile material). "The film quality is high" herein mentioned means that, for example, the density is high, the coverage is high, and the adhesion is high. That is, the film quality of the liner layer 23 is equally high in the flat portions (the portions formed on the upper surfaces of the upper capacitance electrode 20 and first anchor portion 21) and the midair portion (the portion in the air), and in the step portions (the portions formed on the side surfaces of the upper capacitance electrode 20 and first anchor portion 21). Also, the base layer 24 is desirably made of a material that is formed to have high film quality on (in particular, on the step of) the liner layer 23. That is, the film quality of the base layer 24 is equally high in the flat portions (the portions formed on the flat portions of the liner layer 23) and the midair portion (the portion formed on the midair portion of the liner layer 23), and in the step portions (the portions formed on the step portions of the liner layer 23).

In addition, the elastic constant of the base layer 24 is desirably larger than that of the liner layer 23. This is because spring constant k2 of the first spring portion 25 is mainly determined by the elastic constant of the base layer 24 having a large film thickness. That is, spring constant k2 of the first spring portion 25 can be increased by increasing the elastic constant of the base layer 24.

Furthermore, the liner layer 23 and base layer 24 desirably have etching selectivity in the manufacturing process.

When the above mentioned conditions are taken into consideration, the base layer 24 may be made of, instead of silicon nitride, an insulating material such as silicon oxynitride (SiON), a semiconductor material such as polysilicon (poly-Si), silicon (Si), or silicon germanium (SiGe), or a conductive material such as tungsten (W), molybdenum (Mo), or an AlTi alloy. Note that the AlTi alloy can also contain another element in addition to Al and Ti.

On the other hand, the liner layer 23 may be made of an insulating material such as silicon oxynitride, instead of silicon oxide.

When both the liner layer 23 and base layer 24 are made of silicon oxynitride, the composition ratio of liner layer 23/base layer 24 can be, for example, SiONx/SiONy (x<<y) so as to meet the above mentioned conditions.

Note that in this specification, "silicon oxide" contains at least Si and O as main components, "silicon nitride" contains at least Si and N as main components, and "silicon oxynitride" contains at least Si, N, and O as main components.

Note that when the film thickness of the liner layer 23 is sufficiently small, the film quality of the step portion of the liner layer 23 need not be high, so the liner layer 23 can be made of a brittle material other than silicon oxide and silicon oxynitride. This is because when the film thickness of the liner layer 23 is sufficiently small, the etching amount of the liner layer 23 is small in the etching step of the liner layer 23 (to be described later), so etching in the direction parallel to the film surface of the liner layer 23 does not progress, and this makes it possible to prevent disconnection of the step of the liner layer 23.

[Manufacturing Method]

Next, a method of manufacturing the MEMS device 100 according to this embodiment will be explained with reference to FIGS. 3, 4, 5, 6, 7, and 8. In the drawing, particularly the steps of manufacturing the second spring portions 25 will be explained.

FIGS. 3, 4, 5, 6, 7, and 8 are sectional views showing the manufacturing steps of the MEMS device 100 according to this embodiment, and are sectional views taken along line A-A in FIG. 1.

Figure 3:
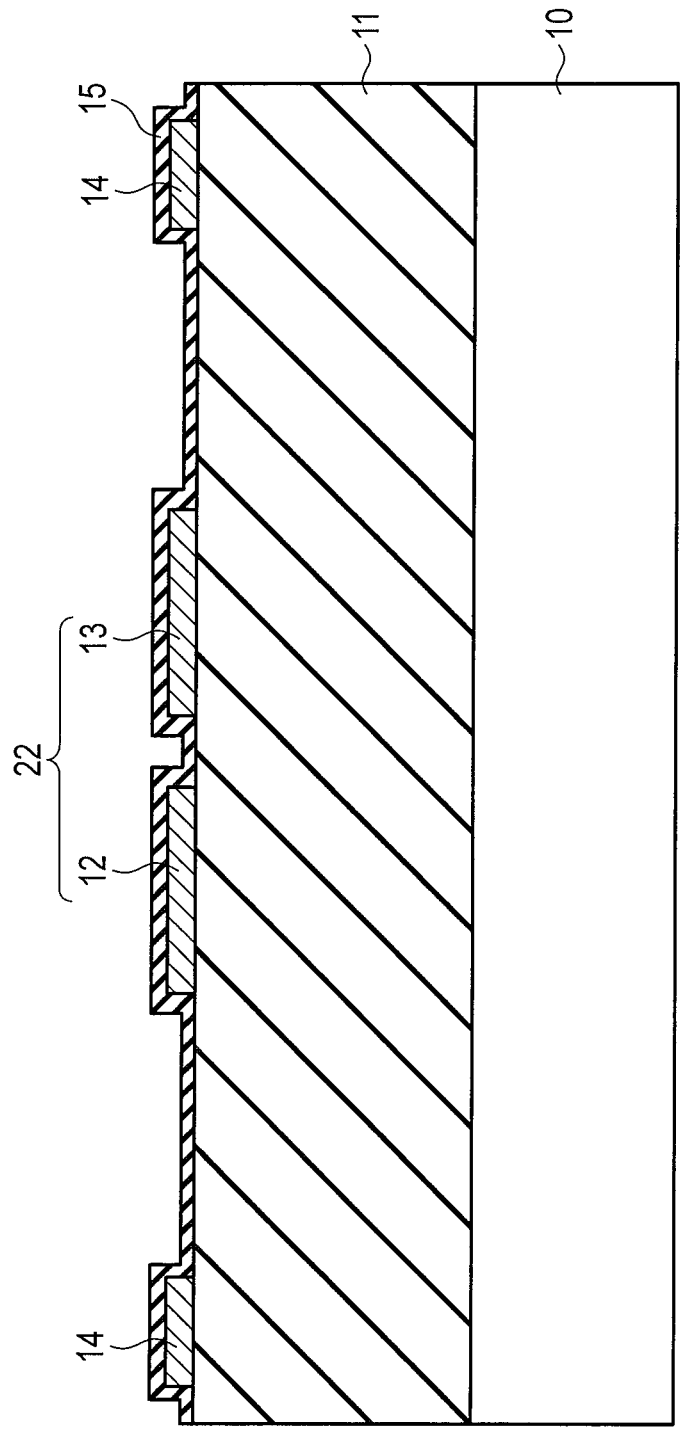
FIG. 3 is a sectional view showing a modification example of the structure of the MEMS device according to the embodiment.

First, as shown in FIG. 3, an interlayer dielectric layer 11 is formed on a substrate 10 by, for example, plasma enhanced chemical vapor deposition (P-CVD). The interlayer dielectric layer 11 is made of, for example, silicon oxide using SiH4 or TEOS as a material. Also, the film thickness of the interlayer dielectric layer 11 is desirably large in order to decrease the parasitic capacitance with, for example, various elements preformed on the substrate 10. The film thickness of the interlayer dielectric layer 11 as a substrate 1 is preferably, for example, 10 μm or more.

Then, a metal layer is uniformly formed on the interlayer dielectric layer 11 by, for example, sputtering. This metal layer is made of a metal such as Al, Cu, or Au, or an alloy containing at least one of these metals. The film thickness of the metal layer is, for example, about 1 μm. After that, the metal layer is patterned by, for example, lithography and reactive ion etching (RIE). Consequently, lower capacitance electrodes 22 (a signal electrode 12 and ground electrode 13), dummy layers 14, and an interconnection 30 are formed on the interlayer dielectric layer 11.

Subsequently, a lower electrode protective layer 15 is formed on the entire surface by, for example, P-CVD. Consequently, the surfaces of the lower capacitance electrodes 22, dummy layers 14, and interconnection 30 are covered with the lower electrode protective layer 15. The lower electrode protective layer 15 is made of an insulator such as silicon oxide, silicon nitride, or a high-k material. The film thickness of the lower electrode protective layer 15 is, for example, about 100 nm.

Figure 4:
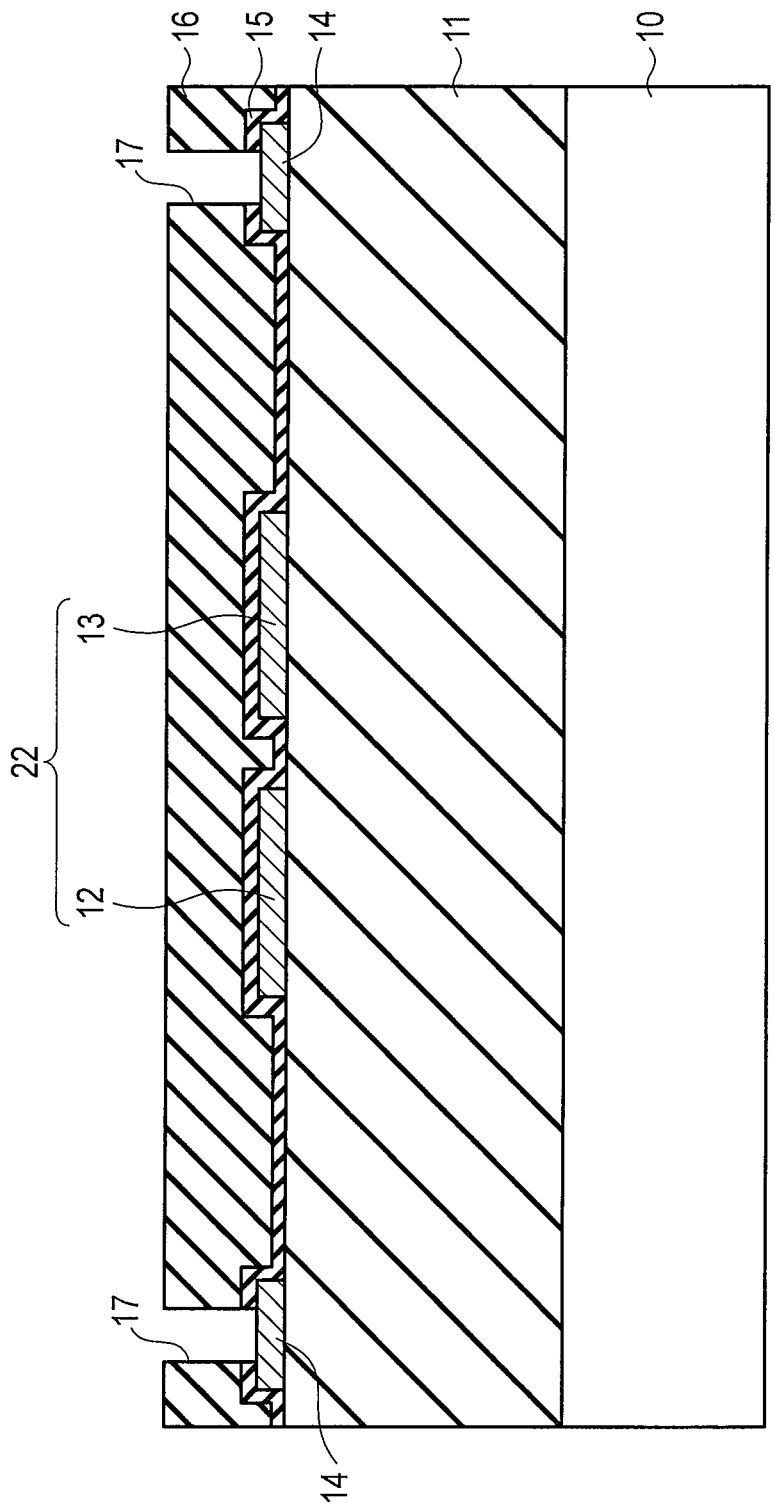
FIGS. 4, 5, 6, 7, and 8 are sectional views showing the manufacturing steps of the MEMS device according to the embodiment.

As shown in FIG. 4, the lower electrode protective layer 15 is coated with a sacrificial layer 16. The sacrificial layer 16 is made of an organic material such as polyimide. The film thickness of the sacrificial layer 16 is, for example, about a few hundred nanometers to a few micrometers. After that, the sacrificial layer 16 is patterned by lithography or the like, thereby exposing portions of the lower electrode protective layer 15. After that, the exposed lower electrode protective layer 15 is etched by, for example, RIE. Consequently, openings 17 are formed in the sacrificial layer 16 and lower electrode protective layer 15 positioned in portions (above the interconnection 30 and dummy layers 14) serving as a second anchor portion 31 and second anchor portions 21, thereby exposing the interconnection 30 and dummy layers 14. In this step, the dummy layers 14 need not be exposed.

Figure 5:
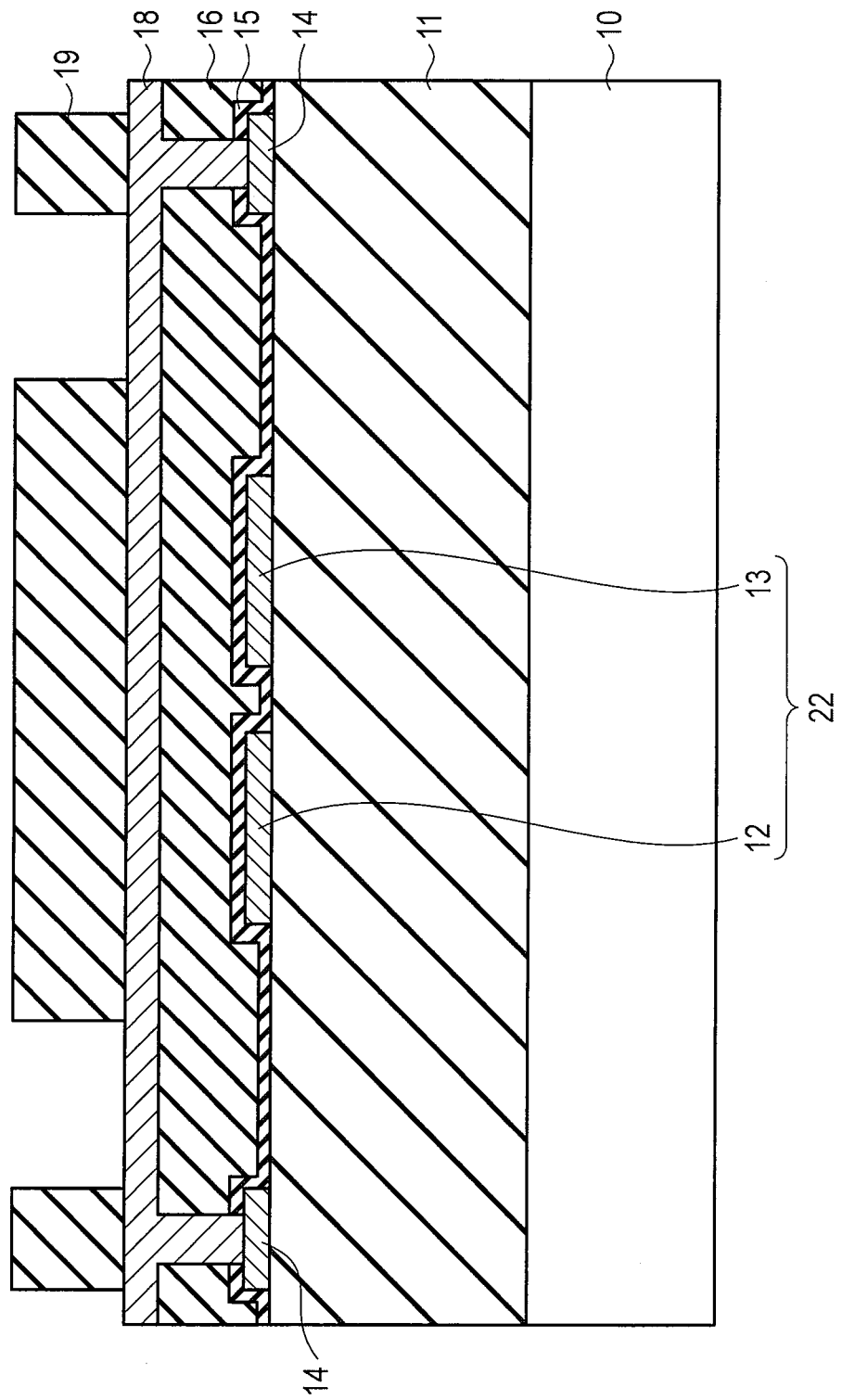

As shown in FIG. 5, a metal layer 18 is formed on the entire surface by, for example, sputtering so as to fill the openings 17. More specifically, the metal layer 18 is formed on the side surfaces of the sacrificial layer 16 (and lower electrode protective layer 15) in the openings 17, and on the upper surface of the sacrificial layer 16 outside the openings 17. Consequently, the metal layer 18 is formed in contact with the interconnection 30 and dummy layer 14 on the bottom surface of each opening 17. The metal layer 18 is made of a ductile material, for example, a metal such as Al, Cu, or Au, or an alloy containing at least one of these metals. The film thickness of the metal layer 18 is, for example, about 0.5 nm to 5 μm.

Then, a resist 19 is formed on the metal layer 18. After that, the resist 19 is patterned by lithography. In this step, the resist 19 is so patterned as to remain in portions where a second anchor portion 31, second spring portion 32, second anchor portions 21, and upper capacitance electrode 20 are formed later.

Figure 6:
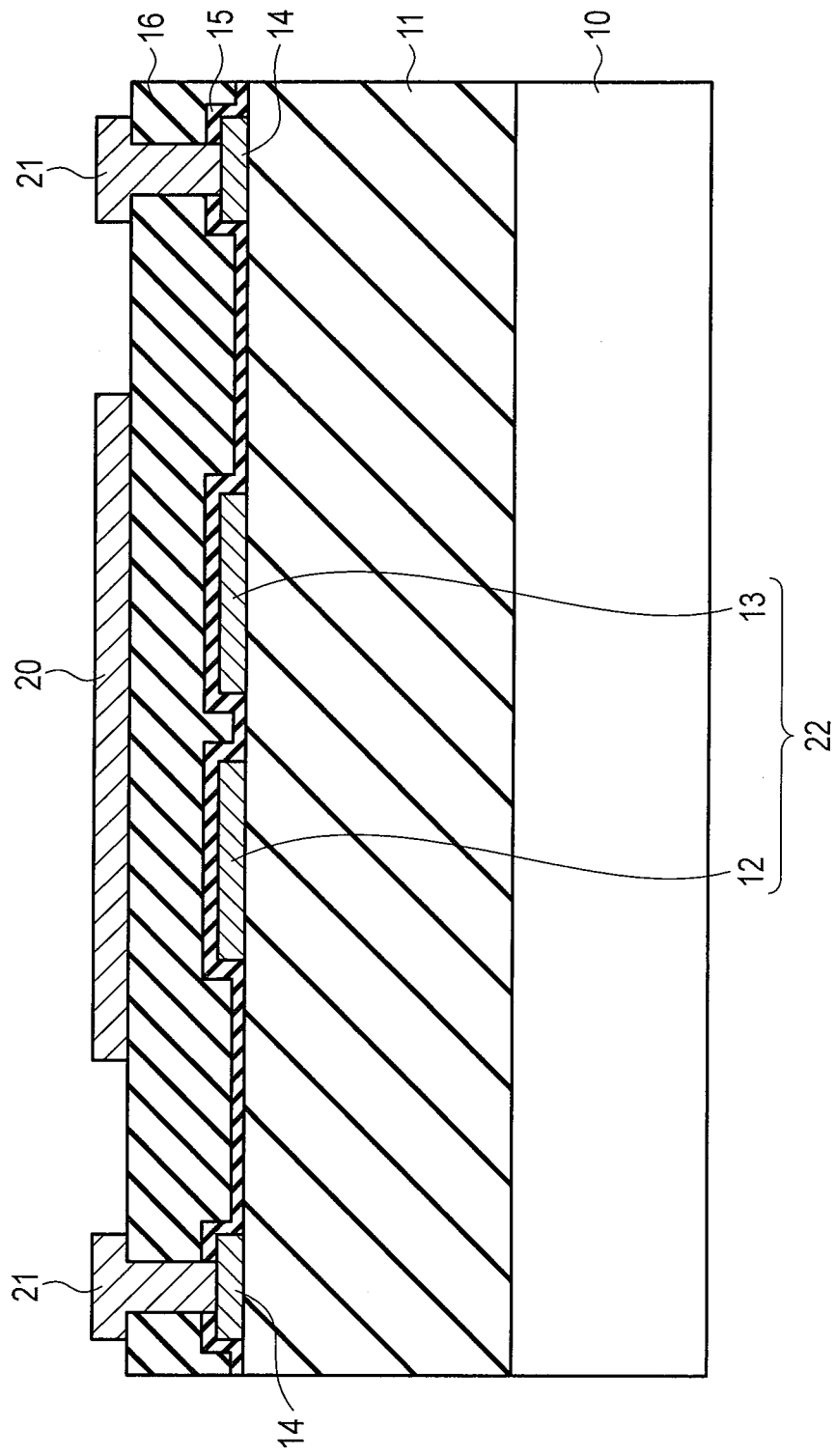

As shown in FIG. 6, the metal layer 18 is patterned by RIE or the like using the resist 19 as a mask. Consequently, second anchor portions 21 are formed on the dummy layers 14 in the openings 17, and an upper capacitance electrode 20 facing the lower capacitance electrode 22 is formed on the sacrificial layer 16. The upper portion of each first anchor portion 21 is formed to protrude from the opening 17, and formed on the same level as that of the upper capacitance electrode 20. Although not shown, a second anchor portion 31 is formed on the interconnection 30, and a second spring portion 32 for connecting the upper capacitance electrode 20 and second anchor portion 31 is formed on the sacrificial layer 16. Accordingly, all the second anchor portion 31, second spring portion 32, second anchor portions 21, and upper capacitance electrode 20 are made of the ductile material forming the metal layer 18.

Figure 7:
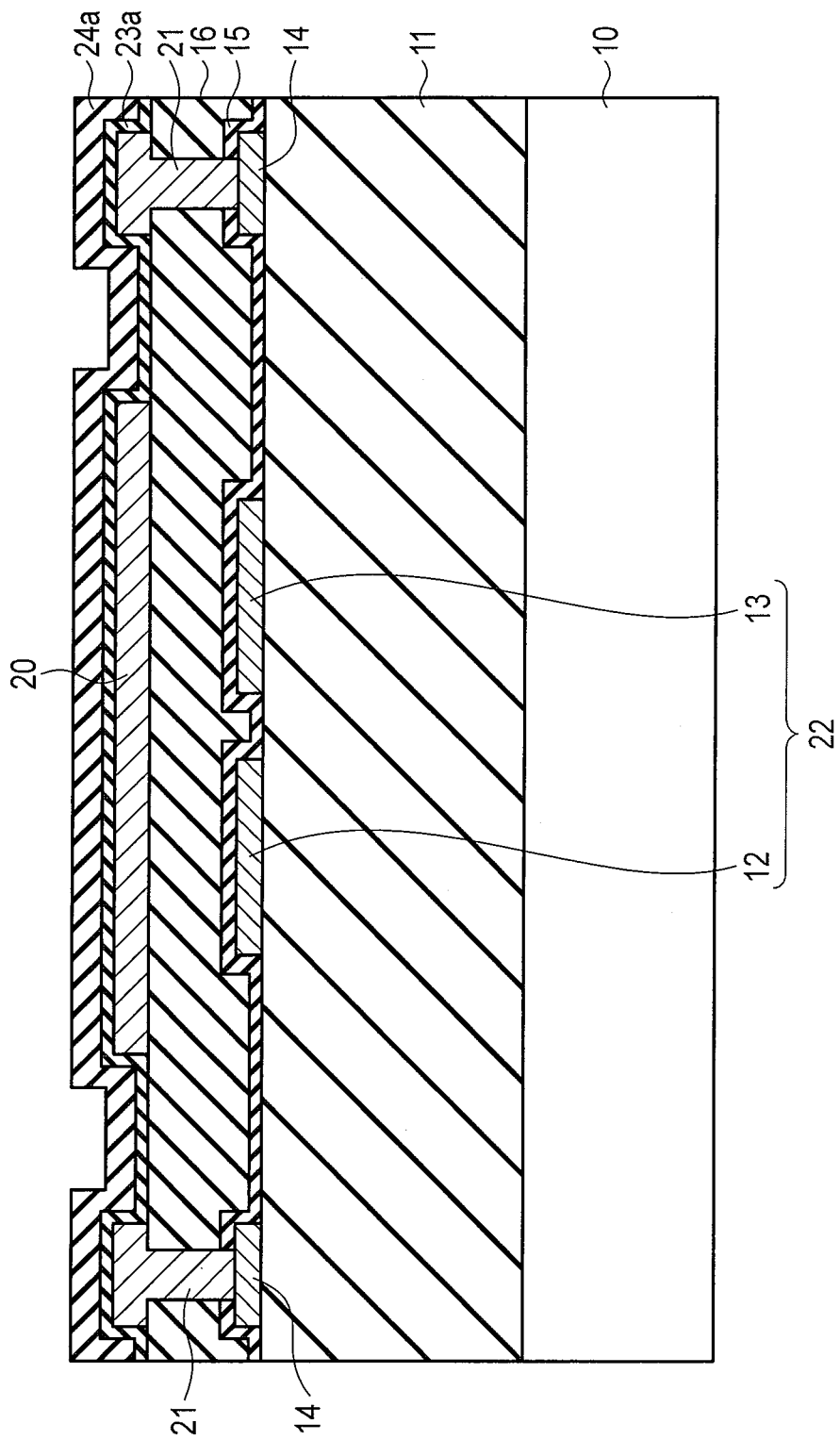

As shown in FIG. 7, a first layer 23a is formed to cover the entire surface. More specifically, the first layer 23a is formed on the upper surfaces and side surfaces of the second anchor portion 31, second spring portion 32, second anchor portions 21, and upper capacitance electrode 20, and on the upper surface of the sacrificial layer 16. The first layer 23a functions as a liner layer 23 of a first spring portion 25 later.

The first layer 23a is made of a brittle material such as silicon oxide using $SiH_4$ or TEOS as a raw material of silicon and formed by P-CVD using $N_2O$ or $O_2$ as an oxidizer. However, the present invention is not limited to this, and the first layer 23a is desirable made of a material that is formed to have film quality higher than that of a second layer 24a (to be described later), on (in particular, on the steps of) the upper capacitance electrode 20 and second anchor portions 21 (the conductive ductile material). That is, the film quality of the first layer 23a is desirably equally high in the portions (flat portions) formed on the upper surfaces of the upper capacitance electrode 20 and second anchor portions 21 and the portion (midair portion) formed on the upper surface of the sacrificial layer 16, and in the portions (step portions) formed on the side surfaces of the upper capacitance electrode 20 and second anchor portions 21.

The film thickness of the first layer 23a is about 25 nm to 1 μm.

Note that although a general P-CVD process is performed at a reaction temperature of about 400° C., if the heat resistant temperature of the sacrificial layer 16 is 400° C. or less, the process reaction temperature of P-CVD is also set at the heat resistant temperature of the sacrificial layer 16 or less.

Then, a second layer 24a is formed to cover the entire surface of the first layer 23a. More specifically, the second layer 24a is formed on the upper surface and side surfaces of the first layer 23a. The second layer 24a functions as a base layer 24 of a first spring portion 25 later.

The second layer 24a is made of a brittle material such as silicon nitride using SiH4 as a raw material of silicon and formed by P-CVD using $NH_3$ or $N_2$ as a nitriding agent. That is, the first and second layers 23a and 24a are made of different brittle materials. However, the present invention is not limited to this, and the second layer 24a is made of a brittle material having etching selectivity to the first layer 23a. More specifically, the first layer 23a is made of a brittle material having an etching rate lower than that of the second layer 24a in the step of etching the second layer 24a.

Also, the second layer 24a is desirably made of a material that is formed to have high film quality on (in particular, on the steps of) the first layer 23a. That is, the film quality of the second layer 24a is desirably equally high in portions formed on the flat portion and midair portion of the liner layer 23, and in portions formed on the steps of the liner layer 23.

Furthermore, the second layer 24a is desirably made of a brittle material having an elastic constant larger than that of the first layer 23a.

When the above mentioned conditions are taken into account, the second layer 24a may be made of, instead of silicon nitride, an insulating material such as silicon oxynitride, a semiconductor material such as poly Si, Si, or SiGe, or a conductive material such as W, Mo, or an AlTi alloy. Note that the AlTi alloy can also contain another element in addition to Al and Ti.

On the other hand, the first layer 23a may be made of an insulating material such as silicon oxynitride, instead of silicon oxide.

When both the first and second layers 23a and 24a are made of silicon oxynitride, the composition ratio of first layer 23a/second layer 24a can be, for example, SiONx/SiONy (x<<y) so as to meet the above mentioned conditions.

Note that in this embodiment, an arrangement in which the first layer 23a is made of silicon oxide and the second layer 24a is made of silicon nitride will be explained.

The film thickness of the second layer 24a is about 500 nm to 5 μm, and desirably larger than that of the first layer 23a. This is because spring constant k2 of the first spring portion 25 is mainly determined by the elastic constant of the base layer 24 having a large film thickness. That is, spring constant k2 of the first spring portion 25 can be increased by increasing the elastic constant of the second layer 24a.

Note that the process reaction temperature of the second layer 24a in P-CVD is set at the heat resistant temperature or less of the sacrificial layer 16, in the same manner as that for the deposition temperature of the first layer 23a.

Figure 8:
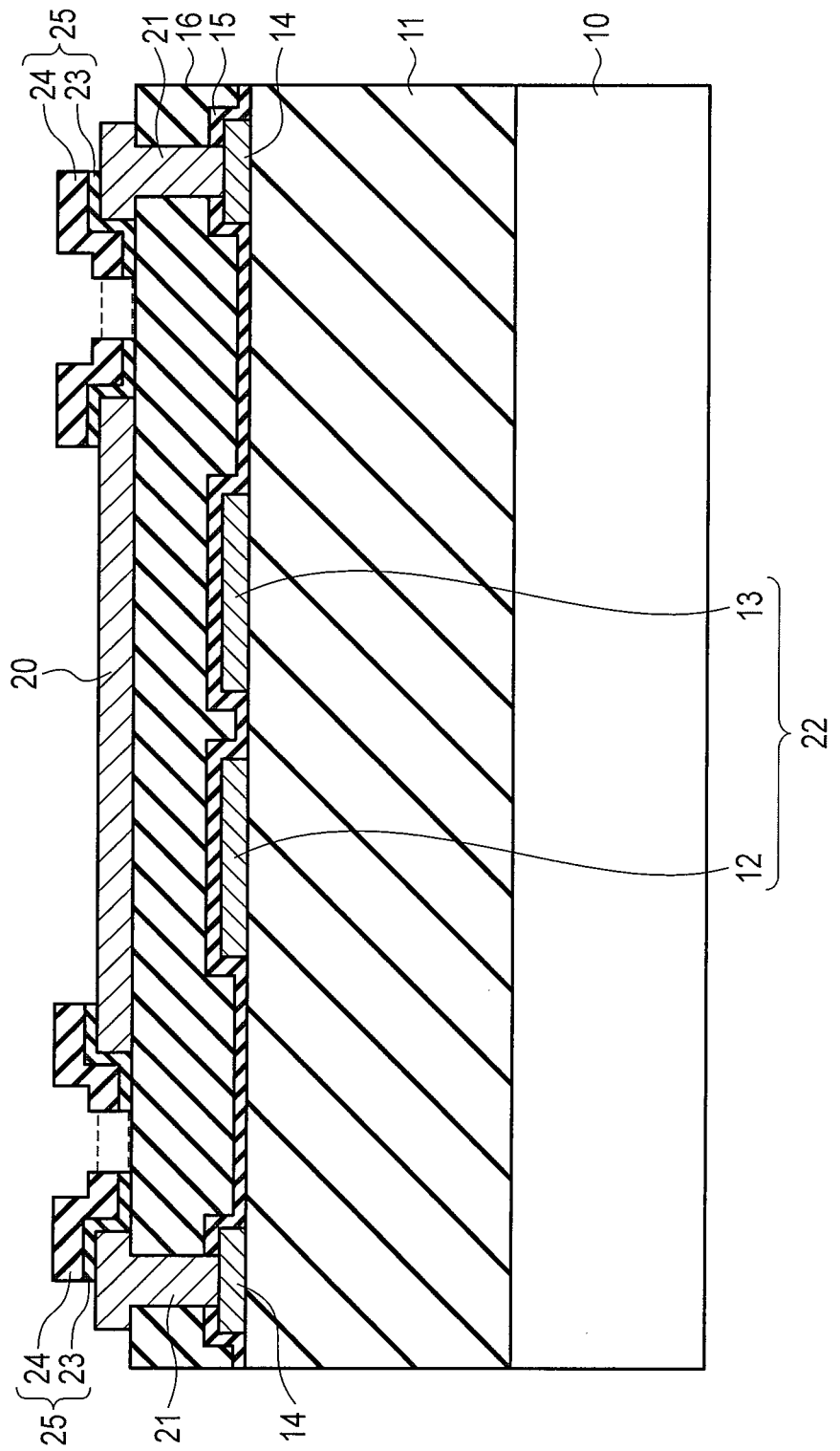

Then, as shown in FIG. 8, a resist (not shown) is formed on the entire surface and patterned by lithography or the like. In this step, the resist is so patterned as to remain in portions where spring portions 25 are formed later.

Subsequently, the second and first layers 24a and 23a are patterned by using the resist as a mask. For example, the second layer 24a (silicon nitride) and first layer 23a (silicon oxide) are patterned by chemical dry etching (CDE). A CF-based gas and $O_2$-based gas are used as etching gases of CDE. Note that even when the second layer 24a is made of a brittle material other than SiN, the second layer 24a is patterned by the same method.

In this state, the second layer 24a is formed to have high film quality on the first layer 23a. This makes it possible to prevent the step of the second layer 24a from being disconnected or thinned, thereby suppressing deterioration of the durability. Also, when the second layer 24a is etched, the etching rate of the first layer 23a is lower than that of the second layer 24a. Therefore, the step of the first layer 23a is not disconnected.

Note that if the CDE etching rate of the first layer 23a is low and the patterning of the first layer 23a does not advance, the first layer 23a may also be patterned by wet etching using dilute HF of the like after CDE. This wet etching does not etch the second layer 24a. When the film thickness of the first layer 23a is sufficiently small, the etching amount (patterning amount) of the first layer 23a is small in the direction perpendicular to the surface of the substrate 10. Therefore, the etching of the first layer 23a does not progress in the direction parallel to the surface of the substrate 10, and it is possible to prevent the disconnection of the step of the first layer 23a. That is, when the film thickness of the first layer 23a is sufficiently small, the step of the first layer 23a is not disconnected before the patterning of the first layer 23a is complete even if the first layer 23a is made of a material having low film quality.

Consequently, second spring portions 25 each including a liner layer 23 and base layer 24 continuously formed from the upper surface and side surface of the upper capacitance electrode 20 to the side surface and upper surface of the first anchor portion 21 are formed.

Note that at least one of the elastic constant, line width, film thickness, and flexure of the first spring portion 25 is properly set so that spring constant k2 of the first spring portion 25 becomes larger than spring constant k1 of the second spring portion 32 made of the ductile material. Practically, at least one of the elastic constant, line width, film thickness, and flexure of the base layer 24 is properly set.

Subsequently, as shown in FIG. 2, the sacrificial layer 16 is removed by, for example, $O_2$-based and Ar-based ashing processes. This sets the second spring portion 32, second spring portions 25, and upper capacitance electrode 20 in a midair state. In other words, a movable region of the upper capacitance electrode 20 is formed between the lower capacitance electrode 22 and upper capacitance electrode 20 (below the upper capacitance electrode 20).

Note that it is actually necessary to form a movable region on the upper capacitance electrode 20 as well. Since the movable region on the upper capacitance electrode 20 can be formed by various known methods, a detailed explanation will be omitted.

For example, after the second spring portions 25 using the brittle material shown in FIG. 8 are formed, a sacrificial layer (not shown) is formed on the upper capacitance electrode 20, second spring portion 32, and second spring portions 25, and an insulating layer (not shown) is formed on the sacrificial layer. After that, a through hole is formed in the insulating layer by patterning, and the sacrificial layer 16 and the unshown sacrificial layer are simultaneously removed by, for example, $O_2$-based and Ar-based ashing processes. Consequently, the movable region of the upper capacitance electrode 20 is formed not only on the upper capacitance electrode 20 but also below it.

Thus, the MEMS device 100 according to this embodiment is formed.

[Effects]

As described above, when a brittle material made of, for example, silicon nitride is formed as a single layered spring portion on a step of a conductive ductile material (to be referred to as Comparative Example 1 hereinafter), the spring portion has no high film quality and is disconnected. On the other hand, when a brittle material made of, for example, silicon oxide is formed as a single layered spring portion on a step of a conductive ductile material (to be referred to as Comparative Example 2 hereinafter), the spring portion having high film quality can be formed. However, the elastic constant of the brittle material made of silicon oxide is smaller than that of the brittle material made of silicon nitride, and this makes it difficult to increase the spring constant of the spring portion. That is, Comparative Examples 1 and 2 have the problem that there is no brittle material having a large elastic constant and formable with high film quality on a conductive ductile material.

In contrast to Comparative Examples 1 and 2, in this embodiment, the first spring portion 25 for connecting the upper electrode 20 and first anchor portion 21 has a multilayered structure including the liner layer 23 made of a brittle material (for example, silicon oxide) and having a small film thickness, and the base layer 24 made of a brittle material (for example, silicon nitride) having a composition different from that of the liner layer 23 and having a large film thickness. This structure can achieve the following effects.

The liner layer 23 made of silicon oxide can be formed to have high film quality on (the flat portions and step portions of) the upper electrode 20 and first anchor portion 21 (the conductive ductile material). Also, the base layer 24 made of silicon nitride can be formed to have high film quality on the liner layer 23. This makes it possible to prevent the steps of the liner layer 23 and base layer 24 from being disconnected or thinned, thereby suppressing deterioration of the durability.

In addition, in this embodiment, the film thickness of the base layer 24 is set larger than that of the liner layer 23. That is, the ratio (film thickness ratio) of the base layer 24 having a large elastic constant is increased in the first spring portion 25. Consequently, spring constant k2 of the first spring portion 25 can be increased.

In this embodiment as explained above, the first spring portion 25 made of a brittle material can be formed to have a structure having desired characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A MEMS element comprising:
a first electrode fixed on a substrate;
a second electrode formed above the first electrode to face it, and vertically movable;
a first anchor portion formed on the substrate and configured to support the second electrode; and
a first spring portion configured to connect the second electrode and the first anchor portion, and having a step between the second electrode and the first anchor portion,
wherein the first spring portion includes a liner layer comprising a brittle material in contact with the second electrode and the first anchor portion, and a base layer formed on the liner layer, comprising a brittle material having a composition different from that of the liner layer, and having a film thickness larger than that of the liner layer.

2. The element of claim 1, wherein the base layer comprises a brittle material having an elastic constant larger than that of the liner layer.

3. The element of claim 2, wherein the liner layer comprises one of silicon oxide and silicon oxynitride.

4. The element of claim 2, wherein the base layer comprises one of silicon nitride, silicon oxynitride, polysilicon, silicon, silicon germanium, tungsten, molybdenum, and aluminum titanium.

5. The element of claim 2, wherein the base layer comprises silicon nitride, and the liner layer comprises silicon oxide.

6. The element of claim 2, wherein the base layer and the liner layer comprise silicon oxynitride, and a composition ratio of nitrogen in the base layer is higher than that of nitrogen in the liner layer.

7. The element of claim 1, wherein the second electrode and the first anchor portion comprise a conductive ductile material.

8. The element of claim 7, wherein the second electrode and the first anchor portion comprise one of aluminum, an alloy containing aluminum as a main component, copper, gold, and platinum.

9. The element of claim 1, wherein the liner layer is continuously formed from an upper surface to a side surface of the first anchor portion, and from an upper surface to a side surface of the second electrode, and has equal film quality on all the surfaces.

10. The element of claim 1, further comprising:
a second anchor portion formed on the substrate and configured to support the second electrode; and
a second spring portion configured to connect the second electrode and the second anchor portion, and comprising a ductile material.

11. The element of claim 10, wherein a spring constant of the first spring portion is larger than that of the second spring portion.

12. The element of claim 10, wherein the second spring portion comprises one of aluminum, an alloy containing aluminum as a main component, copper, gold, and platinum.

13. The element of claim 1, wherein the base layer and the liner layer comprise silicon oxynitride, and a composition ratio of nitrogen in the base layer is higher than that of nitrogen in the liner layer.

* * * * *